United States Patent [19]

Seidlitz et al.

[11] Patent Number: 5,034,238
[45] Date of Patent: Jul. 23, 1991

[54] PROCESS FOR THE REDUCTION OF THE ALCOHOL CONTENT OF ALCOHOLIC BEVERAGES

[75] Inventors: Helmut Seidlitz; Eduard Lack; Heinz Lackner, all of Ternitz, Austria

[73] Assignee: Schoeller-Bleckmann Gesellschaft m.b.h., Austria

[21] Appl. No.: 510,673

[22] Filed: Apr. 18, 1990

[30] Foreign Application Priority Data

May 9, 1989 [AT] Austria ................................. 1104/89

[51] Int. Cl.$^5$ .............................................. C12F 1/00
[52] U.S. Cl. ................................ 426/330.4; 426/493; 426/494; 426/592
[58] Field of Search ............ 426/14, 330.4, 493, 426/494, 492, 425, 387, 592; 203/DIG. 13, 91, 99

[56] References Cited

U.S. PATENT DOCUMENTS

| | | | |
|---|---|---|---|
| 3,917,865 | 11/1975 | Shaw | 426/492 |
| 4,282,259 | 8/1981 | Wheldon | 426/425 |
| 4,327,184 | 4/1982 | Johnson | 426/494 |
| 4,504,503 | 3/1985 | Biernoth | 426/425 |
| 4,561,941 | 12/1985 | Dinnage | 426/387 |
| 4,790,993 | 12/1988 | Schedl | 426/14 |
| 4,867,997 | 9/1989 | Wiesenberger | 426/493 |
| 4,942,045 | 7/1990 | Thumm | 426/14 |

FOREIGN PATENT DOCUMENTS

| | | | |
|---|---|---|---|
| 0077745 | 4/1983 | European Pat. Off. | 426/14 |
| 2505868 | 11/1982 | France | 426/14 |

Primary Examiner—Carolyn Paden
Attorney, Agent, or Firm—Nixon & Vanderhye

[57] ABSTRACT

In a process for the reduction of the alcohol content of alcoholic beverages, in which aromatic substances are extracted with liquid or supercritical $CO_2$, alcohol is separated by distillation and the extracted aromatic substances are at least partially recycled to the beverage with reduced alcohol content, the feedstock, especially wine or beer, is first subjected to a distillation under subatmospheric pressure. The distillate is subjected to an extraction with liquid or supercritical $CO_2$, after which the extract is partially expanded to separate the aroma, and then under the residual pressure is recycled to the bottom product of the distillation in a collecting tank for the end product.

15 Claims, 1 Drawing Sheet

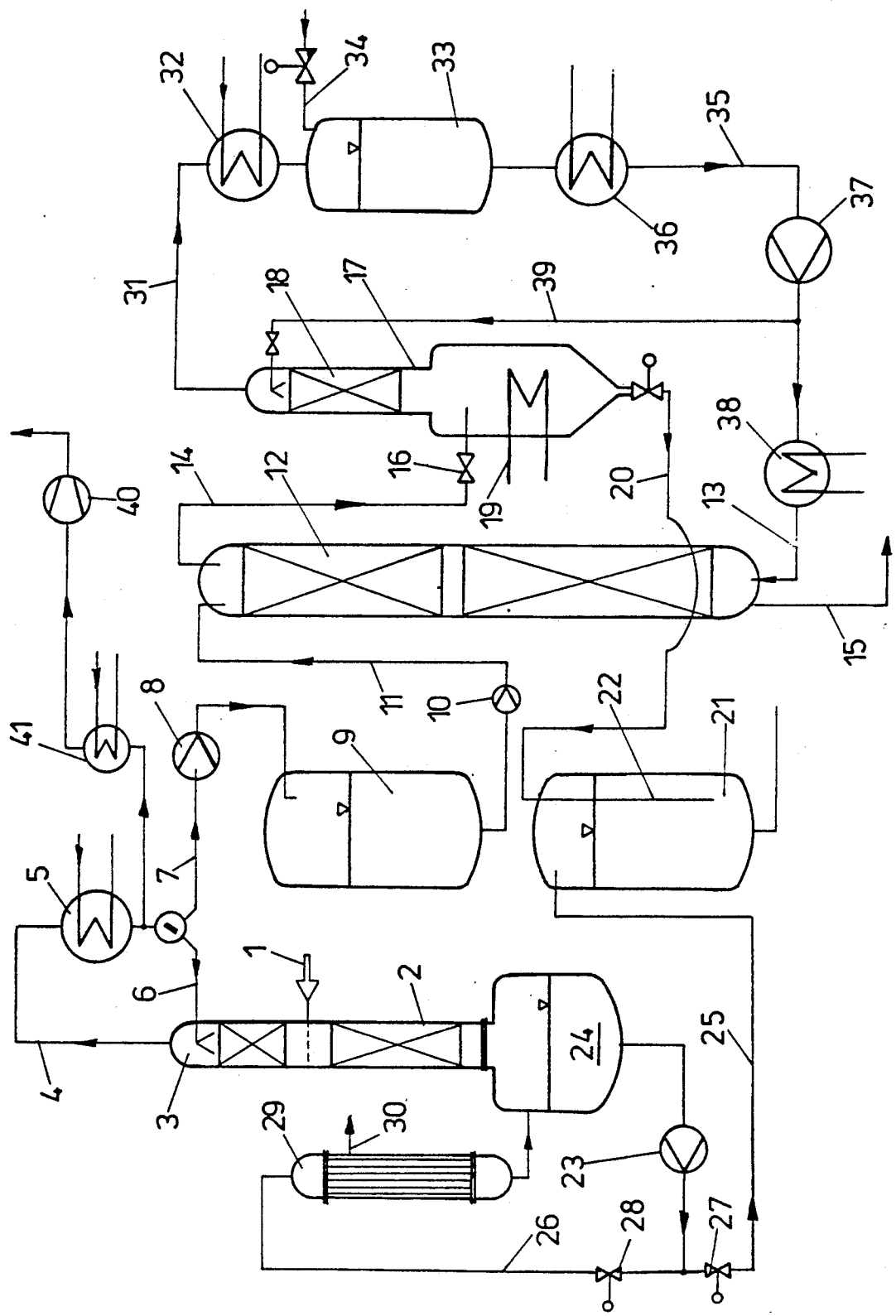

PROCESS FOR THE REDUCTION OF THE ALCOHOL CONTENT OF ALCOHOLIC BEVERAGES

The invention relates to a process for the reduction of the alcohol content of alcoholic beverages, in which aromatic substances are extracted with liquid or supercritical $CO_2$, alcohol is separated by distillation and the extracted aromatic substances are at least partially recycled to the beverage with reduced alcohol content.

BACKGROUND OF THE INVENTION

Processes of the initially mentioned type can be gathered, e.g., from DE-OS 35 42 757. In the previously described process especially for the production of nonalcoholic wine first an aromatic fraction, in which ethanol is also contained, is recovered by extraction with supercritical $CO_2$. The remaining wine is then subjected to a vacuum distillation, in which, besides the almost complete separation of the ethanol from the remaining wine, a fraction of aromatic substances, difficult to extract, not picked up by the extraction, can be recovered, which in the end, together with the extract, can again be added to the dealcoholized remaining wine to produce a nonalcoholic wine.

In this above-described process, the entire amount of the feedstock is subjected to high-pressure extraction, by which expensive and amply dimensioned devices are necessary for the high-pressure extraction. Caused by the high mass flow in the high-pressure part of such a unit considerably operating costs and operating material costs result and, naturally, greater amounts of $CO_2$ are also used. Moreover, in high-pressure extraction of the entire mass flow before distillation there is the danger of an unstable operating performance because of the tendency to foaming in the boundary layer in the extractor.

With the flavor and aromatic substances of an alcoholic beverage forming the bouquet, a great number of different substances are involved, including higher alcohols, esters aldehydes, ketones, lactones, acids, etc., whose total content in the nonalcoholic beverage, for example in the case of wine, is about 0.5 to 1 per thousand of the volume. A part of these flavor and aromatic substances is easily volatile, and the boiling points are partially above and partially below the boiling point of ethanol. In the extraction with supercritical carbon dioxide, ethanol portions, too, are always extracted besides aromatic substances and in principle the possibility exists of influencing the selectivity of the extraction by influencing the extraction conditions. However, a variation of the mass flow ratio of the extraction column is possible only to a limited extent and especially in view of the possibility of an unstable operating performance and foaming is feasible only to a limited extent.

DESCRIPTION OF THE INVENTION

The object of the invention is to provide a process of the initially mentioned type, which in comparison with the previously known process can be performed in a substantially more cost-favorable and simple way and which, with substantially lower equipment expense, yields an end product in which the preponderant portion of the originally contained aromatic substances is again contained. To achieve this object, the process according to the invention consists basically in the feedstock, especially wine or beer, first being subjected to a distillation under subatmospheric pressure, the distillate being subjected to an extraction with liquid or supercritical $CO_2$, after which the extract is partially expanded to separate the aroma, and then under the residual pressure is recycled to the bottom product of the distillation in a collecting tank for the end product. Because the process is begun with a vacuum distillation, an ethanol fraction is recovered, and in the correspondingly mild vacuum distillation a major part of the less volatile aromatic substances remains in the bottom product. The recovered distillate now contains a major part of the more highly volatile aromatic substances and, in comparison with the original amount of the feedstock, represents only a fraction, which usually is less than 20% of the amount of the initial product. For the separation of the aromatic substances from such a distillate thus only a basically smaller mass flow is to be considered, and because according to the invention the distillate is subjected to an extraction with supercritical $CO_2$, with correspondingly selective performance of the separation of the introduced distillate a high degree of separation between aromatic substances and alcohol can be achieved. While up to now there obviously was a prejudice against recovering aromatic substances from an ethanol fraction with good yields, this is possible according to the invention because the distillate, after extraction with liquid or supercritical $CO_2$, is only partially expanded for degassing of $CO_2$ and then is recycled under residual pressure to the bottom product of the distillation in a separate collecting tank. Thus the aromatic substances are not discharged, as in the usual separation of aromatic substances from the $CO_2$ extract, in separate liquid form but rather are discharged under a $CO_2$ residual pressure into the collecting tank. The final expansion to atmospheric conditions in this case takes place only in the collecting tank for the end product, and the process according to the invention is advantageously performed so that the aromatic substances recycled to the end product are expanded in the collecting tank for the end product by spraying. Caused by this shift of the final expansion in the collecting tank, surprisingly a substantially better yield in the recycling of the aromatic substances with overloading by ethanol was achieved, so that a product, largely purified of ethanol, can be obtained with a high portion of aromatic substance.

The separation of aromatic substances from the extract of the distillate can be improved even more because, as corresponds to a preferred embodiment of the process according to the invention, in the separation of aroma after extraction the gaseous head product of the separator is fed to a scrubber in which liquid $CO_2$ is used as scrubbing agent and $CO_2$ together with the aromatic substances is discharged from the separator and recycled to the collecting tank under pressure. Such scrubbing of the aroma to be largely separated in the separation under not yet completely expanded pressure, especially a countercurrent scrubbing with $CO_2$, in this case results in a better intermixing of the aromatic substances with $CO_2$ in the separator being achieved and a selective separation of the aromatic substances becomes possible, which can be sprayed under residual pressure into the collecting tank for the end product. Here this spraying at the same results in a homogenizing and better distribution of the aromatic substances in the end product so that a qualitatively high-grade end product exhibiting substantially constant properties can be obtained directly. The homogeneous intermixing under the residual pressure of CO$_2$ does result in a slight CO$_2$ enrichment of the end product, but which as a rule is not perceived as troublesome and increases the shelf life of the product. But the insertion of a CO$_2$ scrubber in the separation results at the same time in the CO$_2$, which is to be fed into the circuit for the renewed extraction, being purified and especially because of such a simultaneous purification of the CO$_2$ to be fed into the circuit lower CO$_2$ losses occur in comparison with known processes. The process according to the invention is performed here so that the head product of the separator is removed after the scrubbing and is recycled to the extraction after condensation and new arrangement of the extraction conditions.

Another improvement of the quality of the end product can be achieved by the bottom product being fed during distillation through a falling-film evaporator in the circuit, and optionally less volatile aromatic substances remain in the falling-film evaporator and in this way these aromatic substances can be prevented from getting into the distillate.

An especially good separation of aromatic substances and ethanol in the distillate can be achieved by the expansion in the separator being performed to 10 to 60 bars, especially 18 to 25 bars, at temperatures of $-30°$ C. to $+22°$ C., preferably $-22°$ C. to $-15°$ C., for which an at least slight heating is generally necessary. Since the expansion in the separator does not take place to atmospheric conditions but to about 10 to 60 bars, the temperature decrease resulting in the expansion is less by nature so that at this site only slight heat must be fed to guarantee the required temperatures. Especially if the operation is at low temperatures of $-22°$ C. to $-15°$ C., such high residual pressure is desirable to make possible a better separation of aromatic substances from the ethanol.

All in all in the performance of the process according to the invention the operation can be performed in all stages at comparatively low temperatures and according to the invention the distillation perferably is performed at 20 to 100 mbars, preferably 35 to 50 mbars, and at a bottom temperature of 20° to 40° C., preferably 24° C. to 28° C. Since also in the aroma separation the heat requirement is considerably lower, since here also the operation is performed at lower temperatures, the entire heating circuit can be dimensioned smaller and configured more energy-favorable.

The extraction of the aromatic substances from the distillate is advantageously performed at a pressure of 20 to 250 bars, preferably 80 to 100 bars, and at a temperature of $-20°$ C. to $+40°$ C., preferably 25° C. to 35° C., with liquid or supercritical CO$_2$, and here too comparatively gentle conditions and a relatively low temperature can be maintained.

With respect to the advantages of the purification of the CO$_2$ fed in the circuit and the small CO$_2$ losses in this way, an especially simple recycling of the CO$_2$ can be provided, and preferably the CO$_2$ removed from the separator after scrubbing is condensed and stored intermediately at a pressure of 10 to 60 bars, preferably 18 to 25 bars, and in the circuit CO$_2$ to be replenished is fed to the intermediate storage and removed from the latter by a pump to achieve the operating conditions in the extractor and is injected by the bottom of the extractor.

For the extraction of the aromatic substances from the distillate, mass ratios of alcohol: CO$_2$ of 0.2:1 to 5:1 and especially of about 3:1 have proven particularly advantageous.

BRIEF DESCRIPTION OF THE DRAWING

The process according to the invention is explained in greater detail with reference to an example of embodiment of a unit suitable for performing the process represented diagrammatically in the drawing.

The feedstock wine by a pipe 1 gets into a vacuum distillation column 2, at whose head 3 the distillate is removed by pipe 4. Here a gaseous alcohol-water-aromatic substance mixture, containing about 60 to 70% alcohol, is removed from head 3 of vacuum distillation column 2 and the gaseous phase is condensed in a heat exchanger 5 with cooling bottom and can be recycled at least partially by pipe 6 to head 3 of vacuum distillation column 2 to improve the separation. The distillate is removed by pipe 7 and, by pipe 8, gets into collecting tank 9 for the alcohol-water-aromatic substance mixture.

From collecting tank 9 the distillate is conveyed by pump 10 and pipe 11 into extractor 12, to which CO$_2$ under supercritical conditions is fed countercurrent by pipe 13. The extract is removed from the head of extractor 12 by pipe 14, while an alcohol-water mixture can be removed by pipe 15 from the bottom of extractor 12.

The extract removed by pipe 14 gets by throttle 16 into separator 17, in whose head scrubber 18 is placed. Heat exchanger 19 is provided in separator 17 to compensate partially the temperature drop occurring in the partial expansion. But all in all, in separator 17 the operation is performed at considerably lower temperatures in comparison with the temperatures in collecting tank 9, so that the amount of heat to be introduced, necessary for compensation, can be kept low. Scrubbing in scrubber 18 preferably takes place with a partial amount of purified CO$_2$ already fed in the circuit, and under the specified conditions aromatic substances can be separated in high yield from the CO$_2$ and with the remaining residual pressure in separator 17 by pipe 20 can be sprayed by dipping lance 22 into collecting tank 21 for the end product.

Bottom product 24 is fed each time from distillation column 2 to collecting tank 21 for the end product by a pump 23, and pipe 25 is provided for this purpose. Into pipe 25 another branch pipe 26 empties by which the bottom product is fed in the circuit with closed valve 27 and open valve 28. Falling-film evaporator 29 is inserted in this circuit.

The already purified CO$_2$, removed from the separator by pipe 31, is first fed and condensed by a heat exchanger 32 and then gets into collecting tank 33, to which fresh CO$_2$ can be fed each time by pipe 34 to replenish the losses.

The necessary CO$_2$ amount for the extraction and scrubbing of the CO$_2$ in separator 17 is removed from collecting tank 33 for purified CO$_2$ by pipe 35, in which heat exchanger 36, pump or compressor 37 and another heat exchanger 38 are inserted. The extraction conditions in this case are adjusted only by heat exchanger 38, so that the portion of CO$_2$ in gaseous state to be fed to scrubber 18 can be removed by branch pipe 39 before heat exchanger 38.

The vacuum for the vacuum distillation column is produced by pump 40, and heat exchanger 41 for condensation of volatile portions is inserted in the suction pipe.

We claim:

1. Process for the reduction of the alcohol content of alcoholic beverages, said process comprising the steps of:
subjecting a feedstock to distillation under sub-atmospheric pressure to produce a distillate comprising alcohol and aromatic substances;
subjecting said distillate to extraction in an extractor with liquid or supercritical $CO_2$ to produce an extract comprising said aromatic substances;
partially expanding said extract in a separator to separate the aroma; and
recycling the partially expanded extract comprising aromatic substances and with reduced alcohol content under residual pressure to a bottom product of the distillation in a collecting tank for the end product.

2. Process according to claim 1, wherein said feedstock is wine or beer.

3. Process according to claim 1, wherein said partially expanded extract is expanded in said collecting tank by spraying.

4. Process according to claim 1, wherein said separation of said aroma produces a gaseous head product which is fed to a scrubber in which liquid $CO_2$ is used as scrubbing agent and $CO_2$ together with said aromatic substances are discharged from said separator and recycled to said collecting tank under pressure.

5. Process according to claim 1, wherein said gaseous head product is removed after the scrubbing and recycled to the extraction of the condensation and adjustment of the extraction conditions.

6. Process according to claim 1, wherein said bottom product is fed during distillation through a falling-film evaporator.

7. Process according to claim 1, wherein said expansion in said separator is performed at a pressure of 10 to 60 bars and at a temperature of $-30°$ C. to $+22°$ C.

8. Process according to claim 7, wherein said pressure is 18 to 25 bars and said temperature is $-22°$ C. to $-15°$ C.

9. Process according to claim 1, wherein said distillation is performed at a pressure of 20 to 100 mbars and at a bottom temperature of $20°$ C. to $40°$ C.

10. Process according to claim 9, wherein said pressure is 35 to 50 mbars and said temperature is $24°$ C. to $28°$ C.

11. Process according to claim 1, wherein said extraction is performed at a pressure of 20 to 250 bars and at a temperature of $-20°$ C. to $+40°$ C.

12. Process according to claim 11, wherein said pressure is 80 to 100 bars and said temperature is $25°$ C. to $35°$ C.

13. Process according to claim 1, wherein $CO_2$ removed from said separator after scrubbing is condensed and stored at a pressure of 10 to 60 bars, and $CO_2$ to be replenished is fed to an intermediate storage site and pumped therefrom into the bottom of said extractor to achieve desired operating conditions.

14. Process according to claim 1, wherein, in the extraction of the aromatic substances from the distillate, the mass ratio of alcohol: $CO_2$ is 0.2:1 to 5:1.

15. Process according to claim 14, wherein said mass ratio of alcohol: $CO_2$ is 3:1.

* * * * *